(12) United States Patent
Wippler

(10) Patent No.: US 8,011,720 B2
(45) Date of Patent: Sep. 6, 2011

(54) APPARATUS TO AID IN THE ASSEMBLY OF CABLES AND ELECTRICAL COMPONENTS

(75) Inventor: Erik A. Wippler, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 141 days.

(21) Appl. No.: 12/420,892

(22) Filed: Apr. 9, 2009

(65) Prior Publication Data

US 2010/0259063 A1  Oct. 14, 2010

(51) Int. Cl.
  *B60K 37/00* (2006.01)
(52) U.S. Cl. ....................................................... 296/208
(58) Field of Classification Search .................. 296/208; 439/493, 404
  See application file for complete search history.

(56) References Cited

U.S. PATENT DOCUMENTS

| | | | | |
|---|---|---|---|---|
| 4,416,497 A * | 11/1983 | Brandsness et al. | ......... | 439/492 |
| 4,720,044 A * | 1/1988 | Stemwedel, Jr. | .................. | 239/84 |
| 5,225,961 A * | 7/1993 | Zander et al. | ................. | 361/641 |
| 5,324,203 A * | 6/1994 | Sano et al. | ....................... | 439/34 |
| 5,549,344 A * | 8/1996 | Nishijima et al. | .............. | 296/70 |
| 5,735,041 A * | 4/1998 | Zaguskin et al. | ............... | 29/857 |
| 5,839,703 A * | 11/1998 | Tesar | .............................. | 248/65 |
| 6,092,854 A * | 7/2000 | Campbell | ........................ | 296/70 |
| 6,142,427 A | 11/2000 | Kogure et al. | | |
| 6,229,090 B1 * | 5/2001 | Kawaguchi et al. | ......... | 174/72 A |
| 6,305,733 B1 * | 10/2001 | Rahmstorf et al. | ............. | 296/70 |
| 6,364,394 B1 | 4/2002 | Davis, Jr. et al. | | |
| 6,474,716 B2 * | 11/2002 | Shikata et al. | .................. | 296/70 |
| 6,515,229 B2 * | 2/2003 | Aoki et al. | ................... | 174/72 A |
| 6,636,680 B2 * | 10/2003 | Wu et al. | ........................ | 385/137 |
| 6,688,679 B2 * | 2/2004 | Droulez | ........................ | 296/208 |
| 6,688,776 B2 * | 2/2004 | Simmons et al. | ............... | 385/53 |
| 6,724,613 B2 * | 4/2004 | Doshita et al. | ............... | 307/10.1 |
| 6,802,652 B1 * | 10/2004 | Sacchetto et al. | ............... | 385/59 |
| 6,834,900 B2 * | 12/2004 | Wright | .......................... | 296/1.01 |
| 7,053,305 B2 * | 5/2006 | Takase et al. | ................ | 174/72 A |
| 7,517,249 B1 * | 4/2009 | Zhang et al. | ............. | 439/607.01 |
| 7,683,466 B2 * | 3/2010 | Lee | ................................. | 257/676 |
| 2006/0278453 A1 * | 12/2006 | Moll et al. | ........................ | 180/90 |
| 2009/0200123 A1 * | 8/2009 | Wang | .............................. | 188/162 |
| 2010/0259063 A1 * | 10/2010 | Wippler | .......................... | 296/70 |
| 2010/0264276 A1 * | 10/2010 | Wippler et al. | ............... | 248/27.1 |

* cited by examiner

*Primary Examiner* — Kiran B. Patel
(74) *Attorney, Agent, or Firm* — Gifford, Krass, Sprinkle, Anderson & Citkowski, P.C.

(57) ABSTRACT

An apparatus and method for aiding in the assembly of a substrate to a vehicle body structure wherein the substrate includes a cable configured to attach to an electrical component mounted onto the vehicle body structure. The substrate includes a retaining device selectively disposed on the substrate and configured to releasably retain the cable. The retaining device is disposed on the substrate so as to position the cable along the substrate in such a manner that the cable will not interfere with the attachment of the substrate to the vehicle body structure. Accordingly upon attachment of the substrate to the vehicle body structure, the cable is manually removed from the retaining device and attached to the electrical component thereby preventing the cable from being trapped between the substrate and the vehicle body structure during the assembly process.

3 Claims, 7 Drawing Sheets

Method of Aiding the Attachment of a Cable to an Electrical Component Wherein the Cable is Attached to a Substrate and the Electrical Component is Mounted onto a Vehicle Body Structure.

```
┌─────────────────────────────────────────────────────────────┐
│ Provide a Retaining Device Operable to Releasably Retain a  │
│ Cable Disposed on a Substrate.                              │
└─────────────────────────────────────────────────────────────┘
                              │
                              ▼
┌─────────────────────────────────────────────────────────────┐
│ Selectively Dispose the Retaining Device on the Substrate so│
│ as to Position the Cable Along the Substrate and Prevent the│
│ Cable from being Trapped Between the Substrate and the      │
│ Vehicle Body Structure.                                     │
└─────────────────────────────────────────────────────────────┘
                              │
                              ▼
┌─────────────────────────────────────────────────────────────┐
│         Mount the Cable onto the Retaining Device.          │
└─────────────────────────────────────────────────────────────┘
                              │
                              ▼
┌─────────────────────────────────────────────────────────────┐
│         Attach the Substrate onto the Vehicle Body Structure.│
└─────────────────────────────────────────────────────────────┘
                              │
                              ▼
┌─────────────────────────────────────────────────────────────┐
│         Remove the Cable from the Retaining Device.         │
└─────────────────────────────────────────────────────────────┘
                              │
                              ▼
┌─────────────────────────────────────────────────────────────┐
│         Attach the Cable to the Electrical Component.       │
└─────────────────────────────────────────────────────────────┘
```

FIG. 6

APPARATUS TO AID IN THE ASSEMBLY OF CABLES AND ELECTRICAL COMPONENTS

FIELD OF THE INVENTION

The present invention relates generally to an apparatus and method for aiding the assembly of wire cables and electrical components.

DESCRIPTION OF MATERIAL ART

Assembling an automotive vehicle includes the steps of attaching substrates to the vehicle body structure. For example a substrate such as an instrument panel is attached to a vehicle body structure such as an instrument reinforcement bar. In certain instances the substrate will hold electrical devices such as a radio, windshield wipers, navigation systems and the like. Accordingly the substrate is provided with a cable so as to attach the electrical device to an electrical component such as a fuse box.

Naturally these cables may impede the attachment of the substrate to the vehicle body structure, particularly when the packaging space between the substrate and the vehicle body structure are very confined. Attaching the substrate to the vehicle body structure requires an assembly worker to manually position the cable so that the cable is not trapped between the vehicle body structure and the substrate. If the cable gets trapped between the vehicle body structure and the substrate, the cable may be pinched between the vehicle body structure and the substrate, which in turn may cause the cable to fail, as shown in FIG. 1. Furthermore it is advantageous to position the cable such that when the substrate is attached to the vehicle body structure the free end of the cable is accessible and in position to easily engage the electrical component.

It is known to form vehicle instrument panels with a housing for routing cables. In some instances the cables are routed through an elongated channel formed along the instrument panel. This housing configuration fixes the vehicle cable in place and allows the vehicle cable to be in position to attach to the electrical component when the substrate is seated onto the body structure. However the elongated channel requires additional material to form the channel and thus adds cost and weight to the substrate which in turn adds weight and increases the manufacturing cost of a vehicle.

In another example an instrument panel is provided with a cable routing structure. The cable routing structure includes a cable passage disposed along the instrument panel, the cable passage has a slot and a finger is disposed within the slot. The finger is biased so as to fix the cable within the slot. Specifically, the cable is held within the slot by the biasing force of the finger. Accordingly, the cable is subject to a pinching force as a result of the biasing force of the finger pressing the cable between the finger and the edges of the slot. The pinching force may damage the integrity of the cable and cause the cable to fail.

It is currently known to physically manipulate the position of the cable during the installation of the substrate to the body structure so as to ensure that the cable is not inadvertently trapped between the vehicle body structure and the substrate. The problems associated with having the cable trapped between the vehicle body structure and the substrate include damage to the cable, the inability of the worker to connect the cable to an electrical component, or a condition where the cable is pinched between the two parts which may cause failure of the cable and the electrical system. Additionally, the removal of a trapped cable decreases the rate of production as a worker must perform the additional task of removing the attached parts so as to free the trapped cable. Furthermore, the substrate may house a plurality of cables and as such it may be difficult for the worker to position each of the cables in such a manner so as to not obstruct or interfere with the attachment of a substrate to the body structure.

Accordingly it remains desirable to have a method and apparatus for aiding in the assembly of a substrate onto a vehicle body structure that eliminates the potential for the cable to get trapped between the substrate and the vehicle body structure so as to reduce the chances of cable damage due to tight routing conditions. Additionally, it remains desirable to have a device which retains the cable in a position that prevents the cable from being trapped between the vehicle body structure during attachment, wherein the retaining device does not pinch the cable. Furthermore it remains desirable to have a substrate that can position the cable in such a manner while minimizing the cost of manufacturing such a substrate.

SUMMARY OF THE PRESENT INVENTION

The present invention relates generally to an apparatus and method for aiding in the assembly of a substrate to a vehicle body structure wherein the substrate includes a cable configured to attach to an electrical component mounted onto the vehicle body structure. More particularly the substrate includes a retaining device selectively disposed on the substrate and configured to releasably retain the cable. The retaining device is disposed on the substrate so as to position the cable along the substrate in such a manner that the cable will not interfere with the attachment of the substrate to the vehicle body structure. Accordingly upon attachment of the substrate to the vehicle body structure, the cable is manually removed from the retaining device and attached to the electrical component thereby eliminating the chance of the cable being trapped in between the substrate and the vehicle body structure during the assembly process.

BRIEF DESCRIPTION OF THE DRAWINGS

FIG. 6 is a list of the steps of the method of the present invention.

DETAILED DESCRIPTION OF A PREFERRED EMBODIMENT OF THE PRESENT INVENTION

Figure 1:
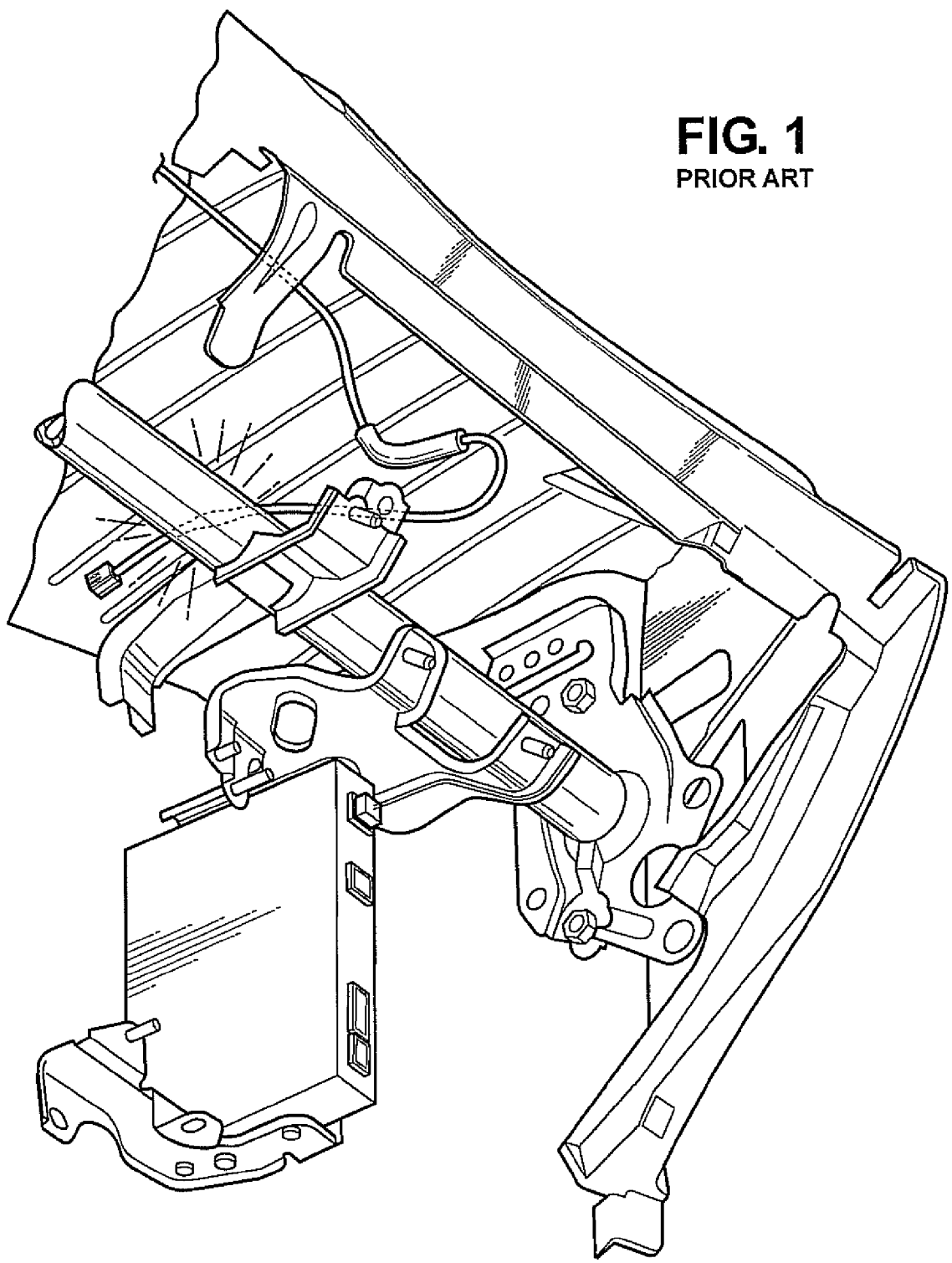
FIG. 1 is a prior art view of the substrate attached to the vehicle body structure.
Figure 2:
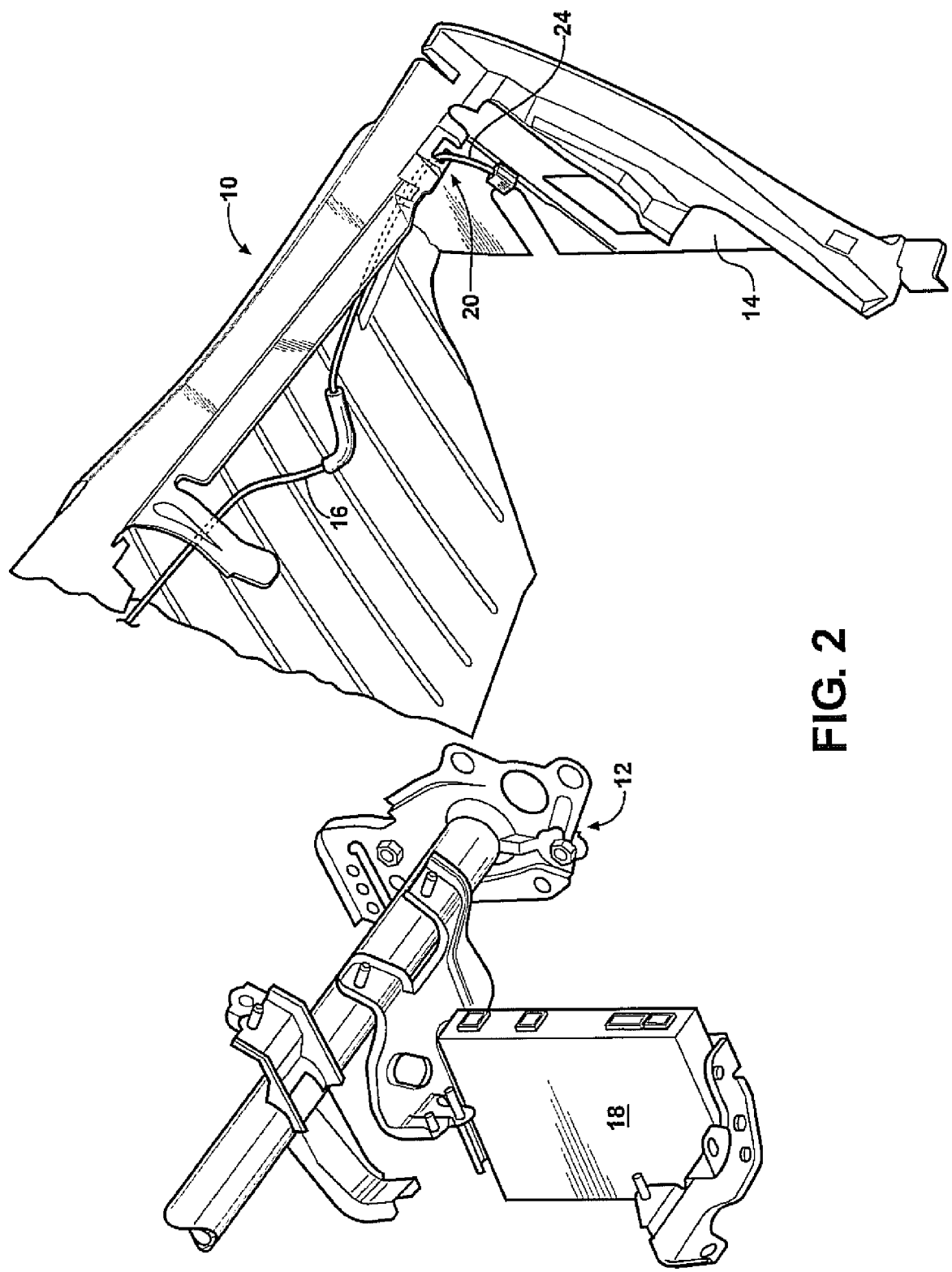
FIG. 2 is an exploded view of a first preferred embodiment of the substrate and the vehicle body structure.

With reference first to FIG. 2 an illustration of a substrate 10 according to the present invention is provided. For illustrative purposes only, the substrate 10 is shown as an instrument panel of a vehicle and the vehicle body structure 12 is shown as an instrument panel reinforcement bar. However it is anticipated that the substrate 10 may be other vehicle parts such as the side panel of a door assembly or the package tray of a vehicle and that the vehicle body structure 12 may be the respective frame of the door or the trunk. The substrate 10 may include mounting portions 14 configured to attach to the vehicle body structure 12.

The substrate 10 includes a cable 16 for connecting an electrical device (not shown) such as a navigation screen to an electrical component 18 such as a fuse box, and a retaining device 20 configured to hold a cable 16. The substrate 10 may be formed of sheet metal, thermoplastic or polyurethane or other like material currently known and used for forming substrates 10. Accordingly the retaining device 20 may be appropriately stamped or injection molded into the substrate 10. The retaining device 20 is selectively disposed on the substrate 10 so as to position the cable 16 such that the cable 16 does not get trapped between the substrate 10 and the vehicle body structure 12 during vehicle assembly.

With reference again to FIG. 2 a first preferred embodiment of the substrate 10 is provided. The substrate 10 includes the retaining device 20 disposed on an outer edge 22 of the substrate 10 and the cable 16 is held by the retaining device 20. Any retaining device 20 currently known and used in the art is suitable for use herein illustratively including a hook. The cable 16 is positioned along the substrate 10 such that the cable 16 is not trapped between the substrate 10 and the vehicle body structure 12 when the two are attached together.

Figure 4:
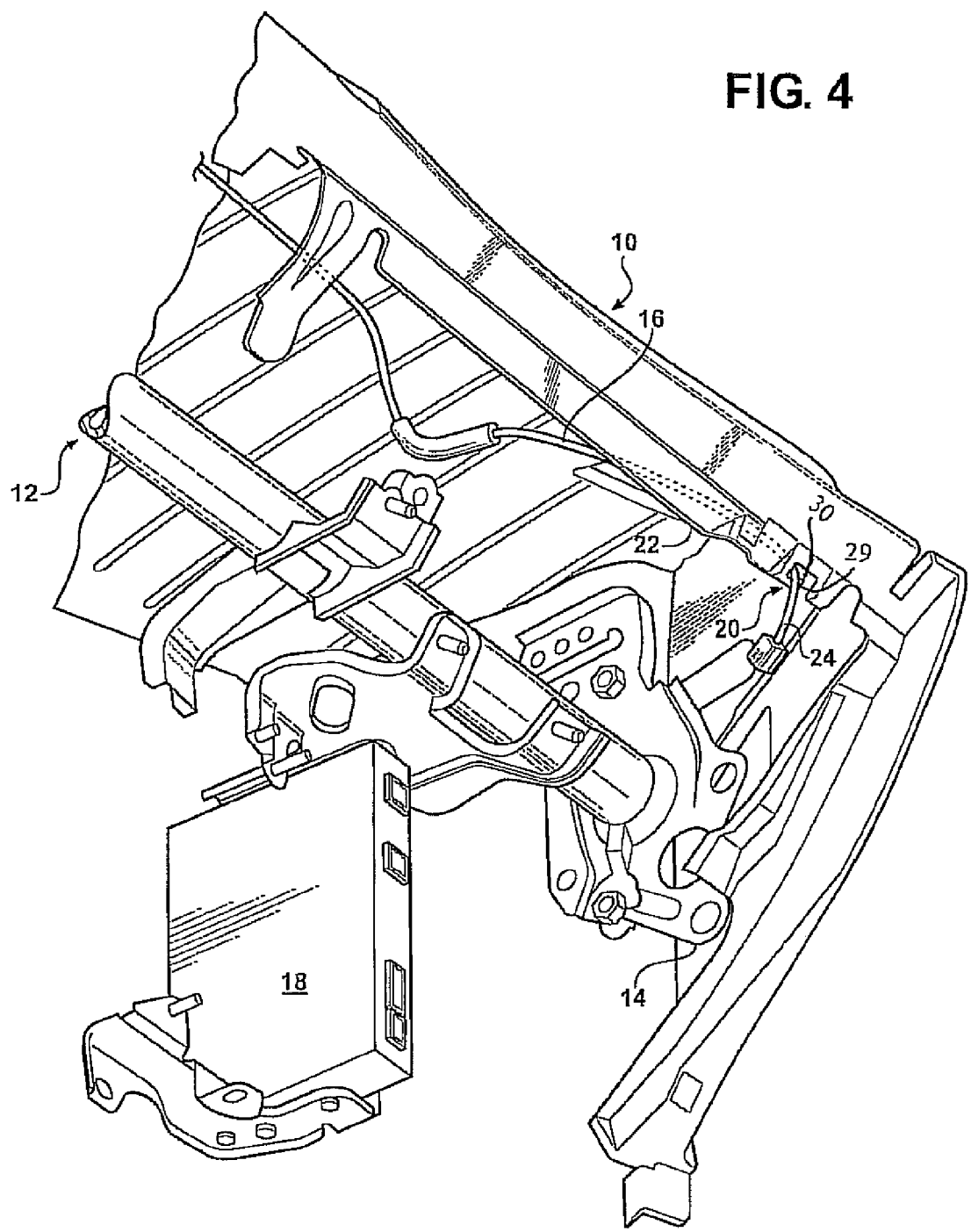
FIG. 4 is a figure showing the substrate attached to the vehicle body structure and the cable positioned by the retaining device.

For example, FIG. 4 shows the electrical component 18 disposed beneath the instrument panel reinforcement bar. It should be appreciated that the position of the electrical component 18 is provided for illustrative purposes only and it is anticipated that the electrical component 18 may be mounted to other portions of the vehicle body structure 12. However, as the electrical component 18 is attached below the instrument panel reinforcement bar it is desirable to position the free end 24 of the cable 16 such that upon attachment of the substrate 10 to the vehicle body structure 12 the free end 24 of the cable 16 is positioned to readily engage the electrical component 18. Thus, the retaining device 20 is shown disposed adjacent the side end of the substrate 10 and generally aligned to the electrical component 18 when the substrate 10 is mounted onto the vehicle body structure 12. Accordingly, the free end 24 of the cable 16 is positioned so as to be accessible and easily attached to the electrical component 18.

With reference again to FIGS. 4 and 5 the retaining device 20 is disposed on an outer edge 22 of the instrument panel 10. The outer edge 22 of the instrument panel 10 includes an opening 26 configured to receive a portion of the cable 16. An elongated member 28 extending generally transversely along the outer edge 22 to a free end 29 so as to partially enclose the opening 26. The elongated member 28 further includes a finger 30 extending generally orthogonal to the elongated member 28 so as to retain the cable 16 on the elongated member 28.

The cable 16 is simply inserted into the opening 26 and slid over the finger 30 where the cable 16 may be held by the retaining device 20. The assembly worker then attaches the substrate 10 onto the vehicle body structure 12. The cable 16 is positioned along the substrate 10 so as to be free of the vehicle body structure 12 when the substrate 10 is mounted onto the vehicle body structure 12. Thus, the retaining device 20 prevents the cable 16 from being trapped between the two parts after they have been attached together.

Figure 3:
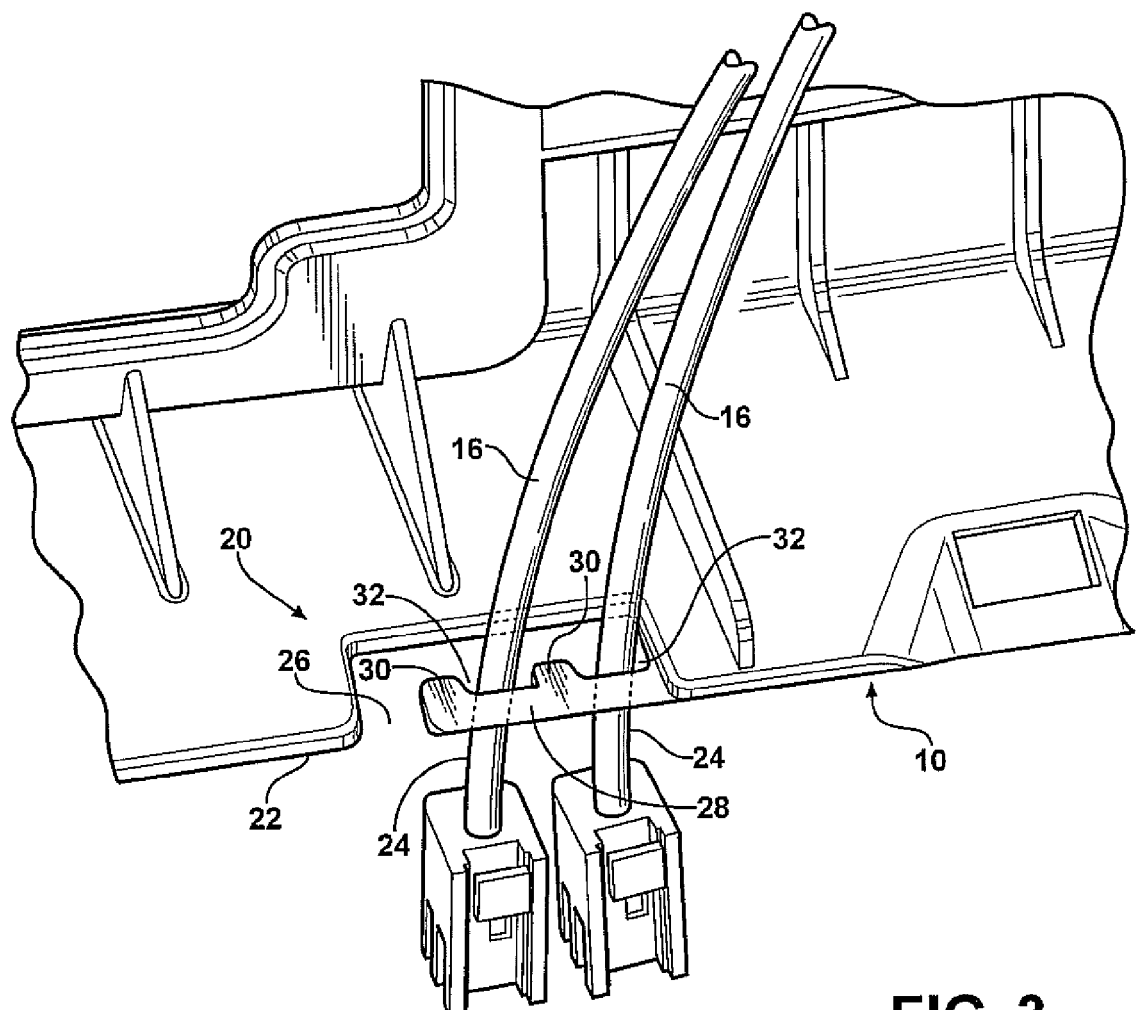
FIG. 3 is an isolated view of a second preferred embodiment of the substrate.

With reference again to FIG. 3, a second preferred embodiment of the substrate 10 is illustrated. In the second preferred embodiment, the elongated member 28 may include a plurality of fingers 30 disposed along the elongated member 28. Each finger 30 is spaced apart from the other so as to form a slot 32 for housing a cable 16. Such a configuration may be preferable where the substrate 10 includes multiple cables 16 configured to connect to the same electrical component 18. Each cable 16 may be inserted into a slot 32 so as to position all of the cables 16 proximate to the electrical component 18 when the substrate 10 and the vehicle body structure 12 are mounted together. Furthermore, all of the cables 16 are then positioned along the substrate 10 such that the cables 16 are not trapped between the substrate 10 and the vehicle body structure 12.

Figure 3A:
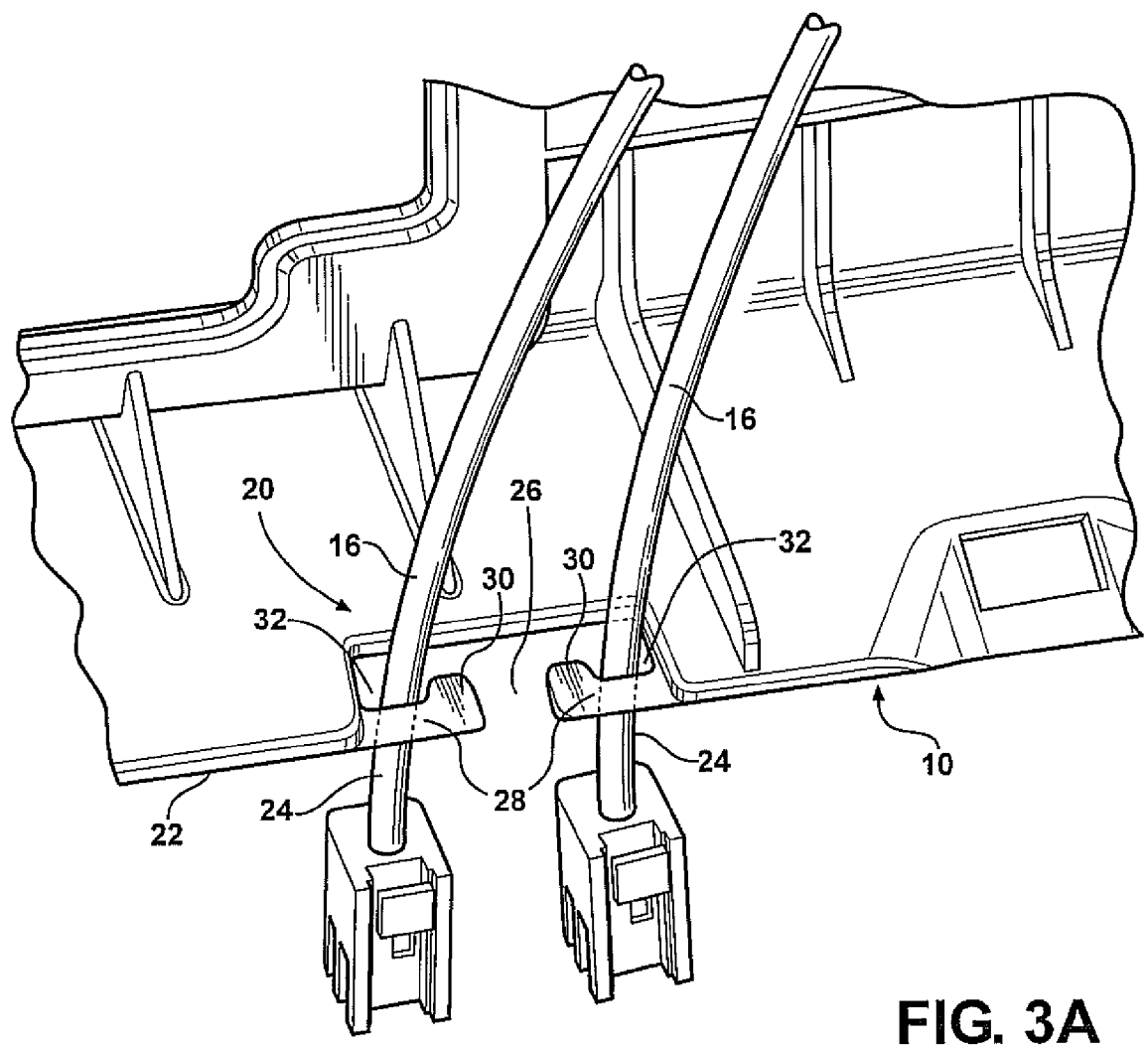
FIG. 3A is an isolated view of a third preferred embodiment of the substrate.

With reference now to FIG. 3A, a third preferred embodiment of the substrate 10 is illustrated. In the third preferred embodiment, the substrate 10 includes a pair of retaining devices 20 spaced apart from each other. The retaining devices 20 are disposed along the outer edge 22 of the substrate 10 and are spaced apart from each other so as to form an opening 26. The opening 26 is configured to allow a portion of the cable 16 to slide through. The elongated member 28 of each of the retaining devices 20 extends towards each other, and the finger 30 extends away from the outer edge 22 so as to hold the free end 24 of the cable 16 along the elongated member 28. The pair of retaining devices 20 are disposed on the outer edge 22 of the substrate 10 so as to position the cable 16 in proximity to the electrical component 18 when the substrate 10 is attached to the vehicle body structure 12. Furthermore, the pair of retaining devices 20 prevent the cable 16 from being trapped between the substrate 10 and the vehicle body structure 12.

Figure 5:
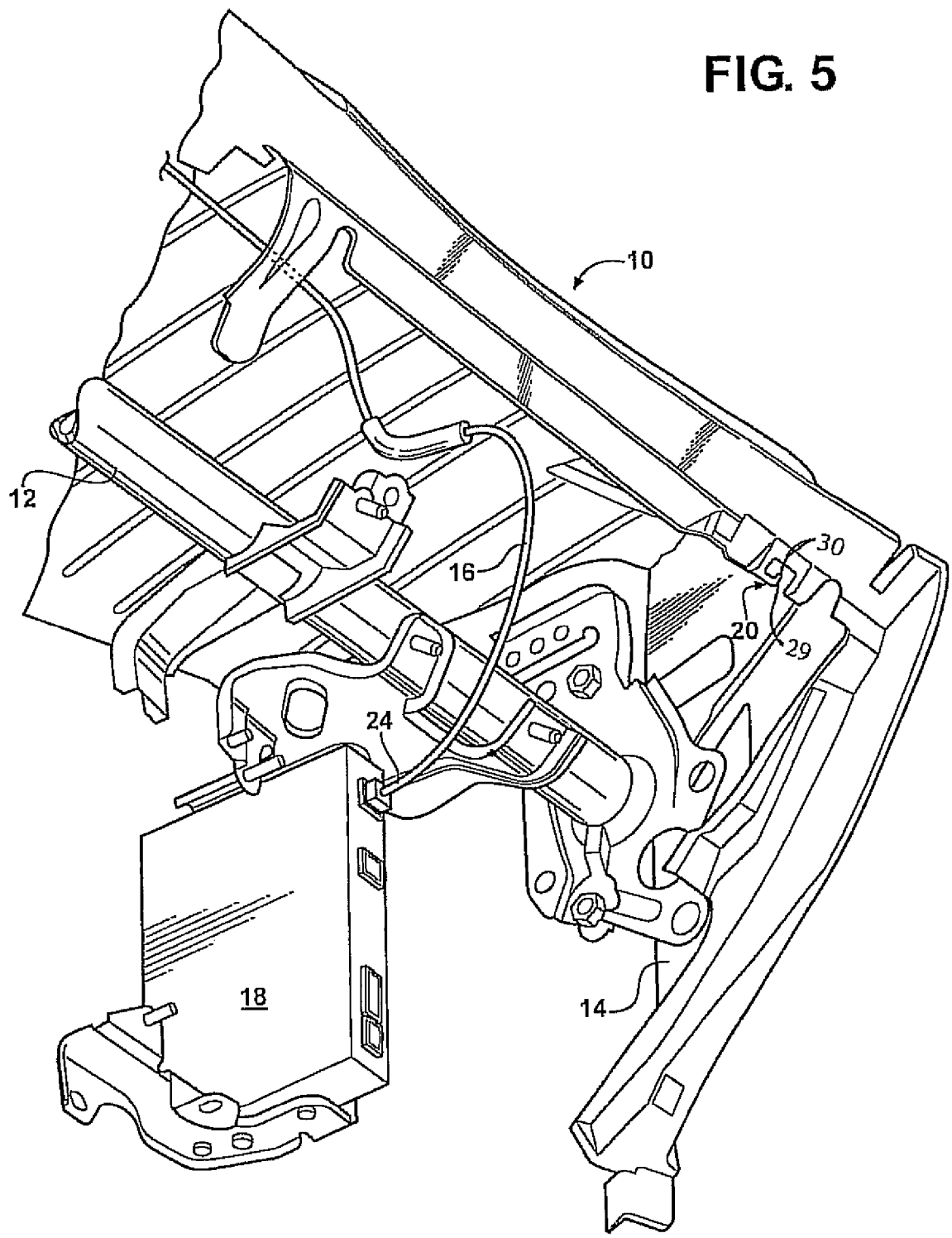
FIG. 5 is an illustration of the cable attached to the electrical component.

The assembly worker then simply removes the cable 16 from the retaining device 20 and inserts the free end 24 of the cable 16 into the electrical component 18, as shown in FIG. 5. Furthermore as shown in FIGS. 4 and 5, the free end 24 of the cable 16 is positioned in relatively close proximity to the electrical component 18 so as to facilitate the connection of the cable 16 to the electrical component 18. It is anticipated that the substrate 10 may include a plurality of retaining devices 20 selectively disposed along the substrate 10. The retaining devices 20 can be arranged on the substrate 10 so as to position the wire and keep it free and clear of the vehicle body structure 12 so as to prevent the wire from being pinched between the substrate 10 and the vehicle body structure 12 during the attachment process.

With reference now to FIG. 6 a method of attaching a substrate 10 having a cable 16 to a vehicle body structure 12 having a component configured to receive the cable 16 is provided. The first step of the method includes providing a retaining device 20 that is configured to releasably retain the cable 16 and selectively disposing the retaining device 20 onto the substrate 10 so that retaining device 20 positions the cable 16 along the substrate 10 in such a manner that the cable 16 is not trapped between the substrate 10 and the vehicle body structure 12 during vehicle assembly operations. The method then proceeds to the step of mounting the cable 16 to the retaining device 20 and attaching the substrate 10 onto the vehicle body structure 12. Once the vehicle body structure 12 is attached onto the substrate 10 the next step is simply removing the cable 16 from the retaining device 20. The cable 16 is then free and clear to attach to the electrical component 18.

Obviously, many modifications and variations of the present invention are possible in light of the above teachings and may be practiced otherwise than as specifically described while within the scope of the appended claims.

The invention claimed is:

1. An instrument panel configured to releasably hold a cable, the cable configured to connect to an electrical device, the instrument panel configured to attach to a vehicle body structure, the instrument panel comprising:

an outer edge extending axially along the instrument panel;

an opening disposed along the outer edge, the opening configured to receive a portion of the cable;

an elongated member extending axially from the outer edge to a free end so as to partially enclose the opening, the elongated member operable to support the weight of the cable within the opening; and a finger disposed adjacent the free end of the elongated member, finger extending generally orthogonal from the elongated member, the finger operable to retain the cable on the elongated member, the finger positioning the cable with respect to the instrument instrument panel so as to prevent the cable from being trapped between the substrate and the vehicle body structure.

2. The instrument panel as set forth in claim 1, wherein the instrument panel includes a side end having a mounting portion, and wherein the vehicle body structure is an instrument panel reinforcement bar, the mounting portion configured to attach to the instrument panel reinforcement bar, and wherein the opening is disposed adjacent the mounting portion of the instrument panel and the electrical device is disposed on the instrument panel reinforcement bar so as to be positioned to receive the cable when the instrument panel is attached to the instrument panel reinforcement bar.

3. The instrument panel as set forth in claim 1, wherein the instrument panel is formed from a material selected from the group comprising sheet metal, thermoplastic, and polyurethane.

\* \* \* \* \*